United States Patent [19]

Dawson et al.

[11] 4,343,193
[45] Aug. 10, 1982

[54] FLUID FLOW MEASURING APPARATUS

[75] Inventors: Raymond W. Dawson, 47, Ingle Head, Fulwood, Preston, Lancs.; Anthony W. Stevenson, Woodley; Ernest Manners, London, all of England

[73] Assignee: Raymond Winston Dawson, Preston, England

[21] Appl. No.: 121,988

[22] Filed: Feb. 15, 1980

[30] Foreign Application Priority Data

Feb. 17, 1979 [GB] United Kingdom ................. 7905672
May 2, 1979 [GB] United Kingdom ................. 7915336

[51] Int. Cl.³ .............................................. G01F 1/42
[52] U.S. Cl. ................................ 73/861.61; 73/432 R
[58] Field of Search ................. 73/861.61, 861.62, 86, 73/432 R; 138/268; 137/44, 94, 94.3

[56] References Cited

U.S. PATENT DOCUMENTS

| | | | |
|---|---|---|---|
| 1,931,797 | 10/1933 | Howard | 138/44 |
| 2,558,247 | 6/1951 | Hamer | 138/44 |
| 2,688,987 | 9/1954 | Whalen | 138/44 |
| 3,007,340 | 11/1961 | Kraftson | 73/86 |
| 3,105,384 | 10/1963 | Hodgemann | 73/861.62 |
| 4,120,313 | 10/1978 | Lewis | 73/86 |
| 4,151,745 | 5/1979 | Cordy | 73/272 |

FOREIGN PATENT DOCUMENTS 625282 1/1936 Fed. Rep. of Germany ... 73/861.61
288930 4/1928 United Kingdom ............. 73/861.62

Primary Examiner—Herbert Goldstein
Attorney, Agent, or Firm—Fleit & Jacobson

[57] ABSTRACT

Fluid flow measuring apparatus comprising first and second pipe portions, a housing positioned around the pipe portions, a chamber in the housing, an orifice plate, an orifice plate moving device for moving the orifice plate from a first position in which it is located between the pipe portions to a second position in which it is located in the chamber in the housing and for moving the orifice plate from the second position to the first position, and a sleeve seal for sealing the pipe portions when the orifice plate is in the second position, the housing being fabricated of metal in sheet and/or tubular form, the housing having a pivotable lid, and the orifice plate moving device being such that it can be pivotted to an inoperative position for allowing access to the orifice plate.

7 Claims, 6 Drawing Figures

FLUID FLOW MEASURING APPARATUS

This invention relates to fluid flow measuring apparatus.

Fluid flow measuring apparatus comprising first and second pipe portions, a housing positioned around the pipe portions, a chamber in the housing and an orifice plate is well known. This known apparatus employs a housing which is cast from metal. The casting can be difficult, leading to expensive fluid flow measuring apparatus which takes a long time to produce.

It is an aim of the present invention to provide fluid flow measuring apparatus in which the housing is not made by casting a metal but is made by fabricating metal in sheet and/or tubular form. It is further aim of the present invention to provide the fluid flow measuring apparatus with sleeve sealing means for sealing the pipe portions when the orifice plate is removed from a position between the pipe portions.

Accordingly, this invention provides fluid flow measuring apparatus comprising first and second pipe portions, a housing positioned around the pipe portions, a chamber in the housing, an orifice plate, orifice plate moving means for moving the orifice plate from a first position in which it is located between the pipe portions to a second position in which it is located in the chamber in the housing and for moving the orifice plate from the second position to the first position, and sleeve sealing means for sealing the pipe portions when the orifice plate is in the second position, the housing being fabricated of metal in sheet and/or tubular form the housing having a pivotable lid, and the orifice plate moving means being such that it can be pivotted to an inoperative position for allowing access to the orifice plate.

The fluid flow measuring apparatus of the present invention can measure the flow rate of gases and liquids. It can be produced to deal with various pipe pressure ratings, for example pipe pressure ratings of 150 to 2500 lbs ASA (American Standards Association). The fluid flow measuring apparatus can also be produced in various sizes, for example in pipe diameters of 2 to 48 inches. With pipe pressure ratings up to 600 lbs ASA the housing can be fabricated from flat steel plates which welded together form a square or rectangular housing. For pipe pressure ratings above 600 lbs ASA, the housing is preferably manufactured from standard line pipe or by rolling a steel sheet into a tubular configuration and then welding the two abutting ends of the sheet together. Usually, domed ends will then be welded on the tubular housing.

The construction of the fluid flow measuring apparatus of the present invention is such that the orifice plate can easily be inspected for wear and replaced if necessary. The orifice plate has to have a sharp edged upstream orifice and this edge becomes warn due to its contact with the fluid being measured. When the edge becomes worn, accurate fluid flow measurements can no longer be achieved. By moving the orifice plate from the first position to the second position, it can easily be inspected for wear whilst fluid can still be passing through the first and second pipe portions by virtue of the fact that the sleeve sealing means will be operated to seal the pipe portions when the orifice plate is in the second position.

Preferably, the orifice plate is held in a carrier member. This enables the plates to be easily changeable since they can be arranged to be a friction fit in the carrier member, the carrier member being easily connected to the orifice plate moving means. Advantageously, the orifice plate is held in the carrier member by a rubber or plastics seal.

The orifice plate moving means may be a screw, hydraulic or pneumatic device. Preferably, the screw device is a worm and nut device.

The sleeve sealing means may be operated by mover means such for example as a screw, hydraulic or pnuematic device. The screw device is preferably a worm and nut device.

Preferably, the sleeve sealing means includes a plurality of ring type seals. The ring type seals are advantageously located on the first and second pipe portions.

The fluid flow measuring apparatus of the present invention may include means for lubricating the sleeve sealing means from an outside position.

The housing of the fluid flow measuring apparatus may have a pressure vent conduit and a re-pressurising conduit, the re-pressurising conduit being connected to one of the first and second pipe portions so that it receives fluid passing through the pipe portions. The pressure vent conduit is preferably screw operated. The re-pressurising conduit is also preferably screw operated and it is usually connected to the pipe portion that will be upstream of the orifice plate in use of the fluid flow measuring apparatus.

Embodiments of the invention will now be described solely by way of example and with reference to the accompanying drawings in which.

Figure 1:
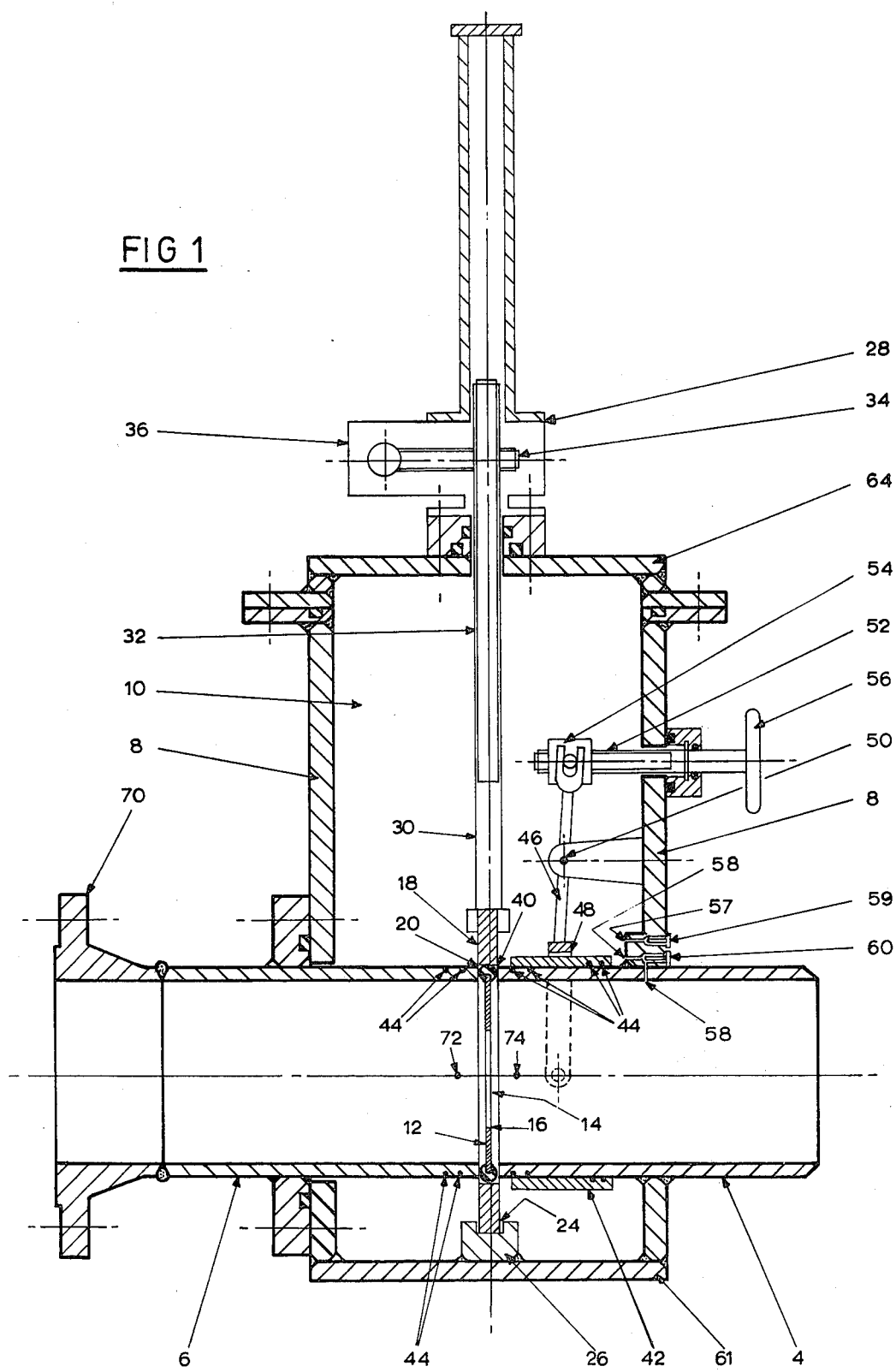
FIG. 1 is a longitudinal section through first fluid flow measuring apparatus.

Referring to FIGS. 1 to 4, there is shown fluid flow measuring apparatus 2 comprising a first pipe portion 4 and a second pipe portion 6. Positioned around the pipe portions 4, 6 is a housing 8 having a chamber 10. An orifice plate 12 having an orifice 14 which has a sharp edge 16 is positioned between the pipe portions 4, 6 as shown in FIG. 1 so that fluid passing from right to left as shown in FIG. 1 has to pass through the orifice 14.

The orifice plate 12 is secured in a carrier member 18. More specifically, a rubber seal 20 is bonded to the orifice plate 12 and this eal 20 is located into a recess 22 in the carrier member 18 as a friction fit. When the orifice plate 12 is in its first position as illustrated in FIG. 1, it will be seen that the carrier member 18 locates in a groove 24 in a boss 26 attached to the housing 8.

The orifice plate 12 can be moved from its first position illustrated in FIG. 1 to a second position in which it is located in the chamber 10 and vice versa by means of orifice plate moving means 28. This means 28 comprises an elongate member 30 which is screw threaded at 32. The screw threads mate with a worm gear 34 housed in a gear box 36. The gear box 36 is provided with a handle 38 so that when the handle 38 is rotated, the worm gear 34 is caused to rotate which can raise or lower the elongate member 30 to move the orifice plate 12 from the position illustrated in FIG. 1 to the chamber 10 and vice versa as desired.

When the orifice plate 12 is moved from the position illustrated in FIG. 1 to the chamber 10, a sleeve sealing means is operated to seal the gap 40 between the pipe portions 4, 6. This sleeve sealing means comprises a sliding sleeve 42 which slides over O-ring seals 44 located as shown around both the pipe portions 4, 6. The sliding sleeve 42 is operated backwards and forwards over the gap 40 by means of a rigid member 46 which has a forked end 48 connected to either side of the sliding sleeve 42. The rigid member 46 is pivoted about a pivot point 50 by means of a glanded screw threaded member 52 operating in a nut arrangement 54 operated by rotating a handle 56.

Figure 2:
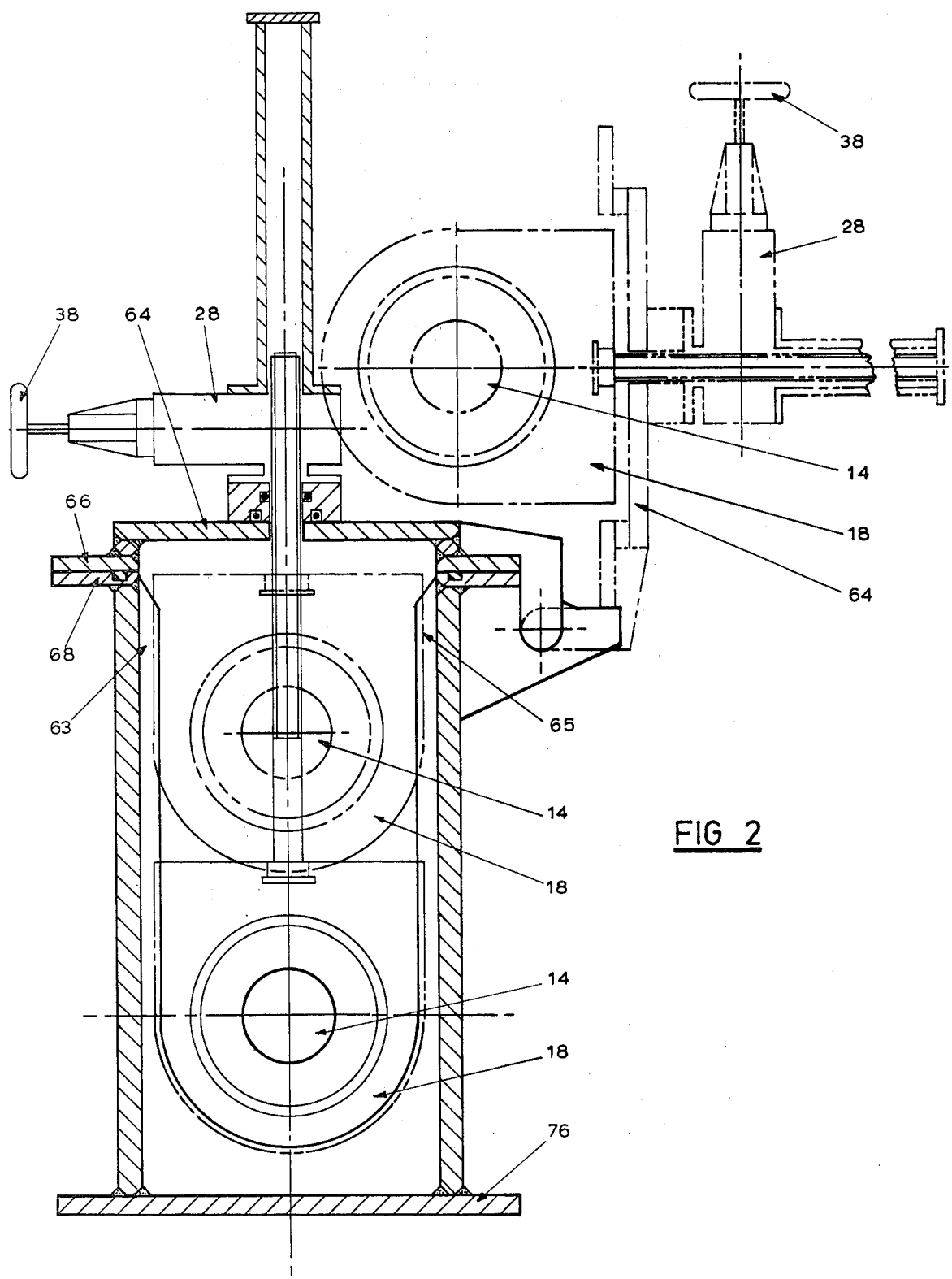
FIG. 2 is a longitudinal section through the apparatus illustrated in FIG. 1 and looking from left to right.
Figure 3:
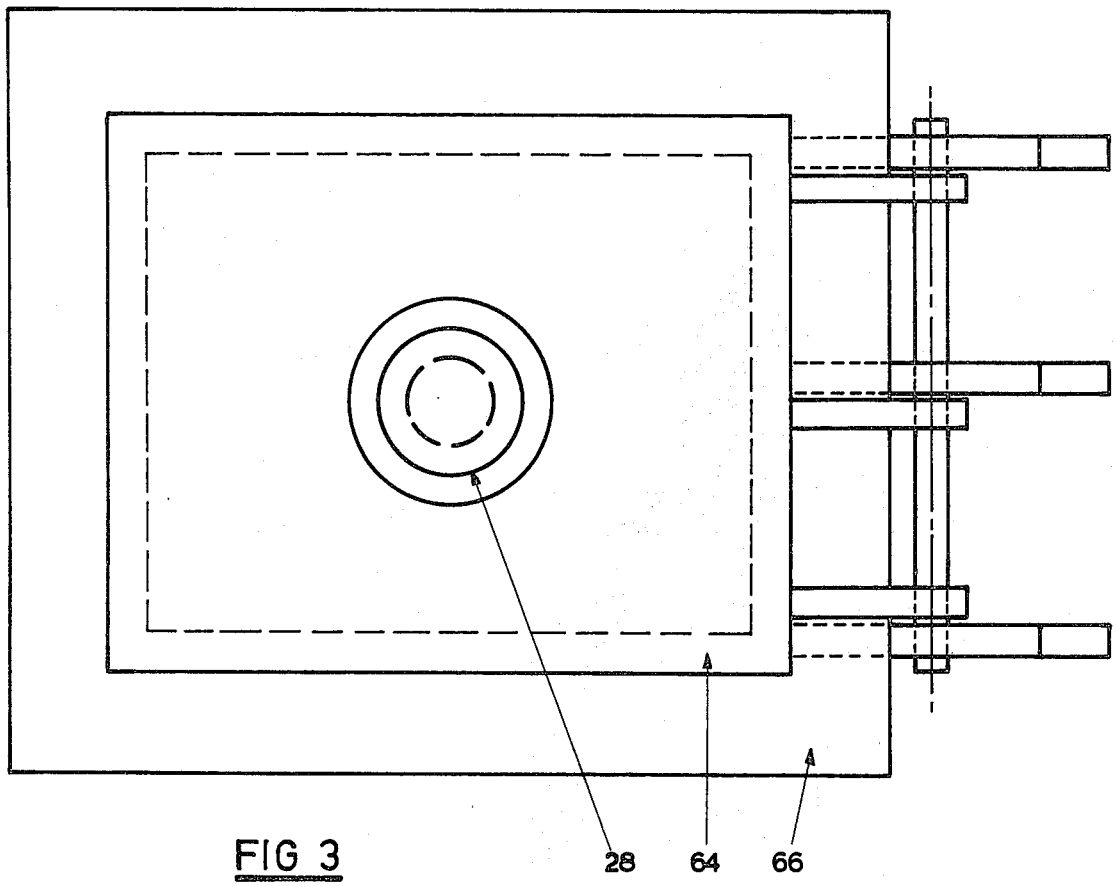
FIG. 3 is a plan view of the apparatus of FIG. 1.
Figure 4:
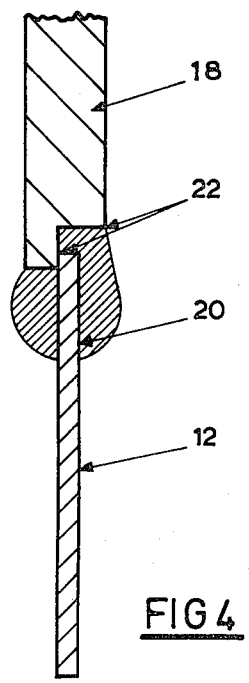
FIG. 4 shows an enlarged part of the apparatus of FIG. 1.

The housing 8 is provided with a re-pressurising conduit 58 which can be opened and closed as desired by means of a screw 60 and which conects the chamber 10 to the interior of the pipe 4. The housing 8 is also provided with a pressure vent conduit 57 which can be opened and closed by means of a screw 59. The housing is further provided with a drain aperture 61 and guides 63, 65 (as shown in FIG. 2) for guiding the carrier member 18 as it is raised or lowered.

In operation of the apparatus 2 illustrated in the drawings, the orifice plate 12 can be moved from its first position illustrated in FIG. 1 into its second position in the chamber 10 when it is desired to inspect and/or replace the orifice plate 12. When the orifice plate 12 is in the chamber 10, the gas pressure in the chamber 10 (which will usually be the same as the gas pressure in the pipe portions 4, 6) can be vented to atmosphere via the pressure vent conduit 57 and the screw 59 after the sleeve 42 has been slid across the gap 40. The lid 64 of the housing 8 can then be loosened by undoing bolts (not shown) in flanges 66, 68 forming part of the housing 8. The lid can then be swung away from the housing 8 together with orifice plate moving means 28 which is secured as illustrated to the lid 64 and which moves to the position illustrated in the top right-hand part of FIG. 2. In this position, the lid 64 abuts against a stop member 67. Access can then be gained to the orifice plate 12 under the lid 64. If the orifice plate 12 needs replacing, it can easily be pushed out of the carrier member 18 and a new orifice plate 12 can easily be inserted into the carrier member 18.

The apparatus 2 can easily be connected into a gas pipeline by welding the pipe portion 4 to one end of a gas pipe and by bolting the flange 70 to the other end of the gas pipe. Gas flow can then be measured through the pipe using the orifice plate 12 and differential pressure sensing holes 72, 74 which are positioned upstream and downstream of the orifice plate 12 in a known manner. These sensors 72, 74 are connected to known gas flow measuring apparatus in a known manner.

Figure 5:
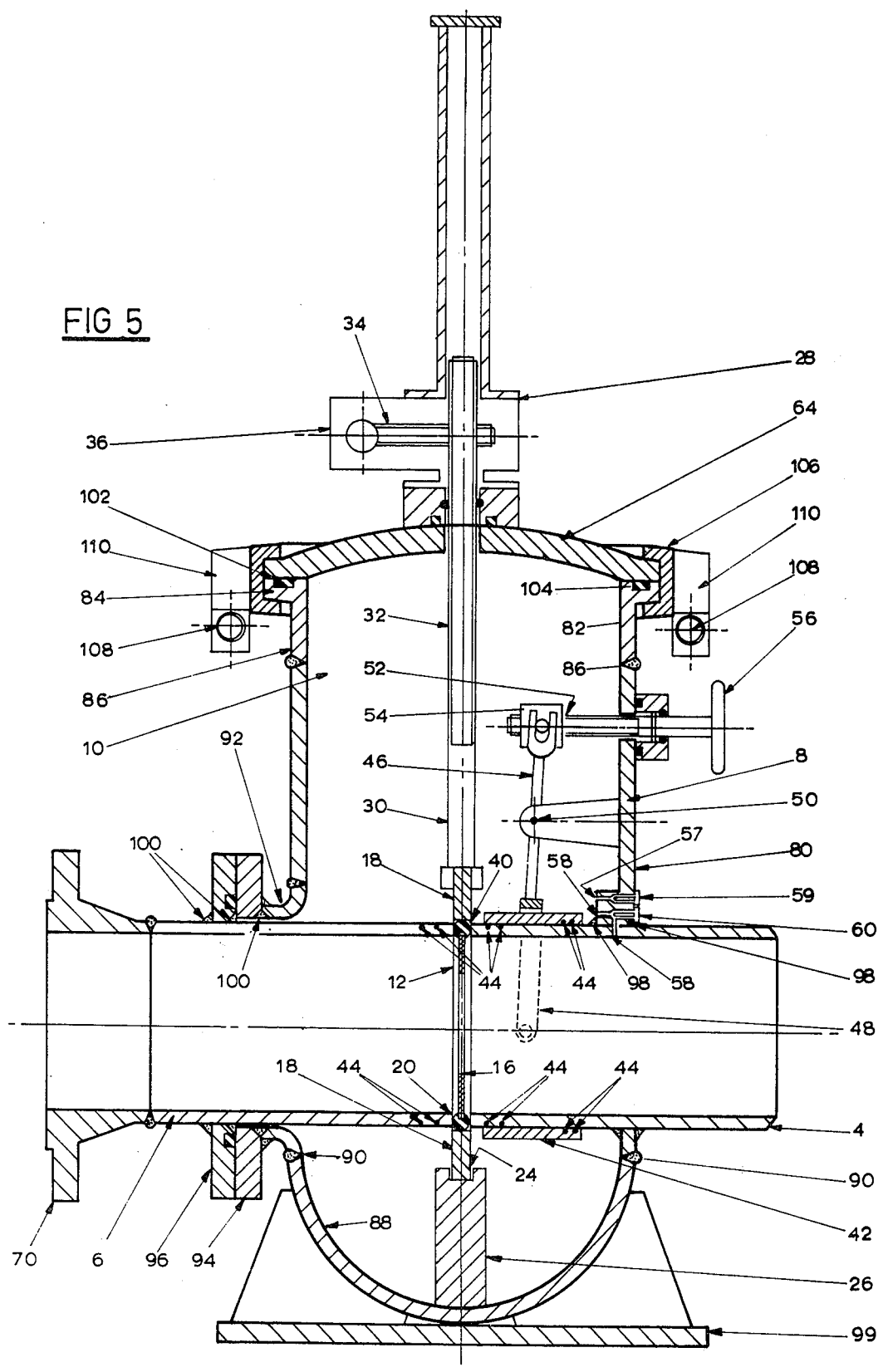
FIG. 5 is a longitudinal section through second fluid flow measuring apparatus.
Figure 6:
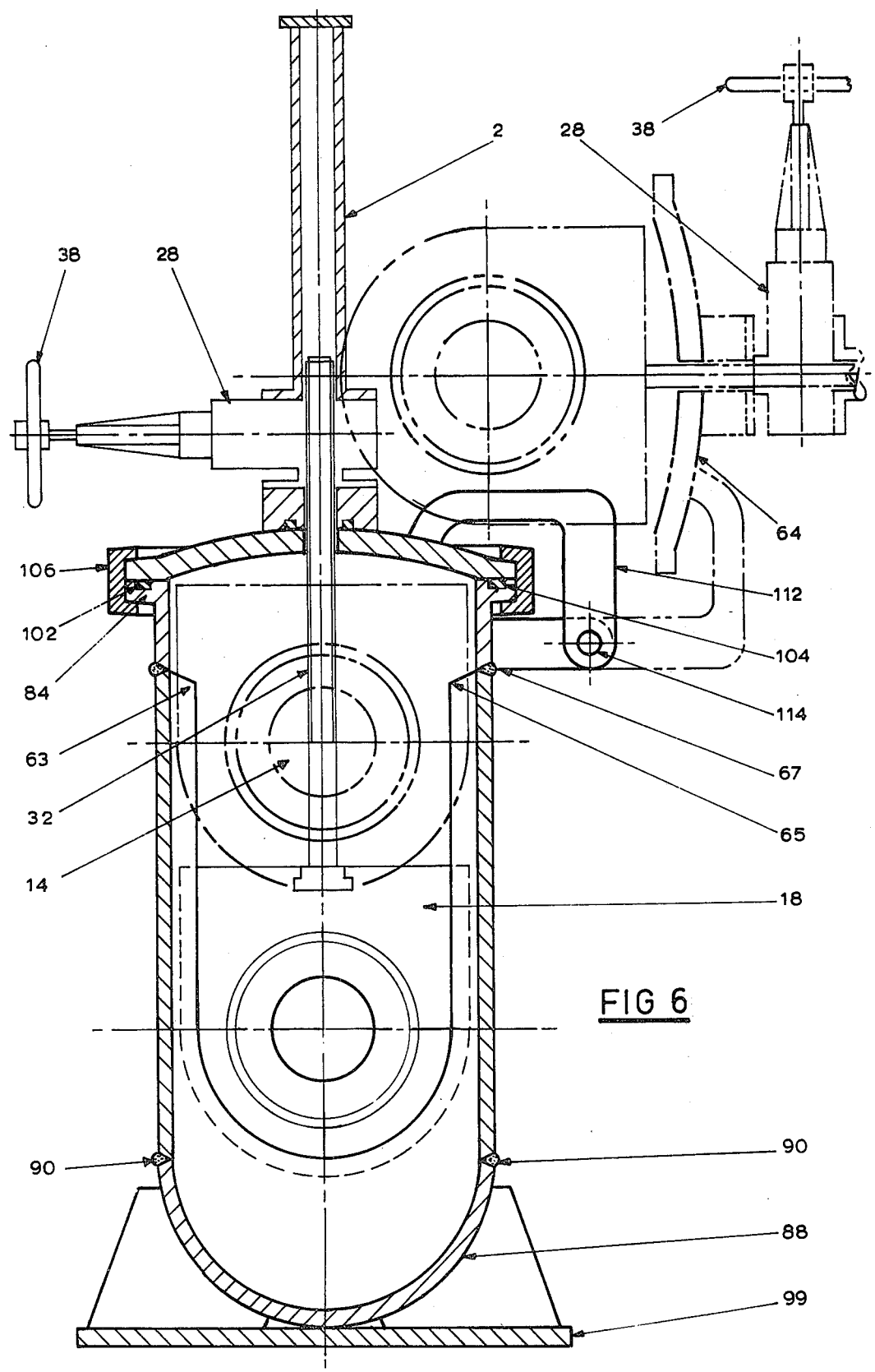
FIG. 6 is a longitudinal section through the apparatus of FIG. 5 and looking from left to right.

Referring to FIGS. 5 and 6, there is shown fluid flow measuring apparatus 2 which is similar to the fluid flow measuring apparatus 2 illustrated in FIGS. 1 to 4. Similar parts have been given the same reference numerals and their precise construction and operation will not again be given in order to avoid undue repetition of description. Only the differences between the two pieces of fluid flow measuring apparatus 2 will be discussed.

In FIGS. 5 and 6, the housing 8 has been fabricated from a tubular pipe portion 80 which is of circular cross section. A short pipe portion 82 having a flange 84 is welded to the pipe portion 80 by welds 86. A curved base portion 88 is welded to the pipe portion 80 by welds 90. The base portion 88 sits in a base stand 99.

A stub portion 92 is pulled from the pipe portion 80, for example by means of a mandrel (not shown), and plates 94, 96 are welded in position as illustrated. The first pipe portion 4 is welded to the pipe portion 80 by welds 98, and the second pipe portion 6 is welded to the pipe portion 80 and to the plates 94, 96 by welds 100.

It will be noticed that in FIGS. 5 and 6, some of the seals 44 are differently positioned than in the apparatus 2 illustrated in FIGS. 1 to 4.

The appartus 2 illustrated in FIGS. 5 and 6 is provided with a quick release lid 64. The lid sits on the flange 84 and is sealed thereto by a seal 102 which sits in a recess 104 in the flange 84. A collar 106 is in two parts and it is bolted over the flange 84 and the edge of the lid 64 to hold the lid 64 tightly in position on the flange 84. The two parts of the collar 106 are bolted together by bolts (not shown) passing through bolt holes 108 in extension members 110 which form part of the collar 106. Releasing these bolts and removing the collar 106 allows the lid 64 to pivot to the open position illustrated in dotted lines in FIG. 6.

The pivoting of the lid 64 to its open position is achieved by having the lid 64 secured to a cranked arm 112. The cranked arm 112 is connected to the stop member 67 by a pivot 114.

The apparatus 2 illustrated in FIGS. 5 and 6 is especially useful for measuring fluids at high pressures. For example, the apparatus 2 can deal with pipe pressure ratings of from 1500 to 2500 ASA (American Standards Association). The pipe portions 80, 82 can be produced from seamless or seam welded pipe as desired.

It is to be appreciated that the embodiments of the invention described above have been given by way of example only and that modifications may be effected. Thus, for example, the apparatus 2 may be modified as desired to measure the flow of a liquid through the pipe portions 4, 6 instead of a gas. Furthermore, it will be noticed that the housing 8 has been formed by welding various plates together to form a rectangular flat sided construction. Such a construction is preferably only used for gas pressures up to 600 lbs ASA and, at higher pressures, the housing 8 would preferably be constructed of standard line pipe or a single sheet of metal which would be bent into tubular form, welded along the seam and then provided with a domed base and lid, thus forming a true pressure containing structure.

The member 26 can be fixed or adjustable as desired, it preferably being adjustable and the type of mounting flange 76 employed can be varied as desired. Further, hydraulic or pneumatic devices can be employed instead of the screw-operated devices for moving the orifice plate 12 and the sliding sleeve 42. If desired, the entire apparatus 2 can be housed in a housing (not shown), any necessary connections between the housing and the pipes 4, 6 being effected by flexible couplings (not shown). Further, the pipe portions 4, 6 can be adapted to be welded or bolted at both ends into a pipeline. Other types of quick release fittings for the lid 64 may be employed and the pipe portions 80, 82 can be of a cross sectional shape other than circular.

We claim:

1. Fluid flow measuring apparatus comprising first and second pipe portions, a housing positioned around the pipe portions, a chamber in the housing, an orifice plate, orifice plate moving means for moving the orifice plate from a first position in which it is located between the pipe portions to a second position in which it is located in the chamber in the housing and for moving the orifice plate from the second position to the first position, and sleeve sealing means for sealing the pipe portions when the orifice plate is in the second position, the housing being fabricated of metal in sheet and/or tubular form, the housing having a pivotable lid, and the orifice plate moving means being such that it can be pivoted to an inoperative position for allowing access to the orifice plate.

2. Fluid flow measuring apparatus according to claim 1 in which the orifice plate is held in a carrier member.

3. Fluid flow measuring apparatus according to claim 2 in which the orifice plate is held in the carrier member by a rubber or plastics seal.

4. Fluid flow measuring apparatus according to claim 1, 2 or 3 in which the orifice plate moving means and the sleeve sliding arrangement are both screw, hydraulic or pneumatic devices.

5. Fluid flow measuring apparatus according to claim 1, 2 or 3 in which the sleeve sliding arrangement includes a plurality of ring type seals located on the first and second pipe portions.

6. Fluid flow measuring apparatus according to claim 1, 2 or 3 including a pressure vent conduit and a re-pressurising conduit, the re-pressurising conduit being connected to one of the first and second pipe portions so that it receives fluid passing through the pipe portions.

7. Fluid flow measuring apparatus according to claim 1, 2 or 3 including a screw operated pressure vent conduit and a screw operated re-pressurising conduit, the re-pressurising conduit being connected to the pipe portion that will be upstream of the orifice plate in use of the fluid flow measuring apparatus.

* * * * *